(12) United States Patent
Kissoon

(10) Patent No.: US 10,086,274 B2
(45) Date of Patent: Oct. 2, 2018

(54) GAME CONTROLLER BUTTON BIAS ADJUSTMENT MECHANISM

(71) Applicant: Aran N. Kissoon, Richfield, MN (US)

(72) Inventor: Aran N. Kissoon, Richfield, MN (US)

( * ) Notice: Subject to any disclaimer, the term of this patent is extended or adjusted under 35 U.S.C. 154(b) by 35 days.

(21) Appl. No.: 15/061,708

(22) Filed: Mar. 4, 2016

(65) Prior Publication Data

US 2016/0256772 A1 Sep. 8, 2016

Related U.S. Application Data

(60) Provisional application No. 62/128,640, filed on Mar. 5, 2015.

(51) Int. Cl.
*A63F 13/24* (2014.01)
*A63F 13/98* (2014.01)
*H01H 3/12* (2006.01)
*H01H 23/14* (2006.01)

(52) U.S. Cl.
CPC ............ *A63F 13/24* (2014.09); *H01H 3/12* (2013.01); *A63F 13/98* (2014.09); *H01H 23/141* (2013.01); *H01H 2231/008* (2013.01)

(58) Field of Classification Search
CPC ................. A63F 13/24; A63F 13/98
See application file for complete search history.

(56) References Cited

U.S. PATENT DOCUMENTS

| | | | | |
|---|---|---|---|---|
| 4,589,830 A | * | 5/1986 | Clawson | B29C 45/84 192/143 |
| 4,909,514 A | * | 3/1990 | Tano | A63F 13/02 273/148 B |
| 2010/0298053 A1 | * | 11/2010 | Kotkin | A63F 13/24 463/37 |

OTHER PUBLICATIONS

Flute for Dummies, Karen Evans Moratz, copyright © 2010 by Wiley publishing, Inc., Indianapolis, Indiana.*

* cited by examiner

*Primary Examiner* — William H McCulloch, Jr.
*Assistant Examiner* — Yingchuan Zhang
(74) *Attorney, Agent, or Firm* — Schwegman Lundberg & Woessner, P.A.

(57) ABSTRACT

A game controller button biasing mechanism includes a battery cover having a trigger support, a trigger body coupled to the trigger support to pivot about a pivot point, the trigger body having a back shaped to engage with a game controller button, and wherein the trigger support comprises an adjustable protrusion disposed in an opening to control biasing of the game controller button by the back of the trigger body via a biasing bar coupled to the trigger body.

13 Claims, 7 Drawing Sheets

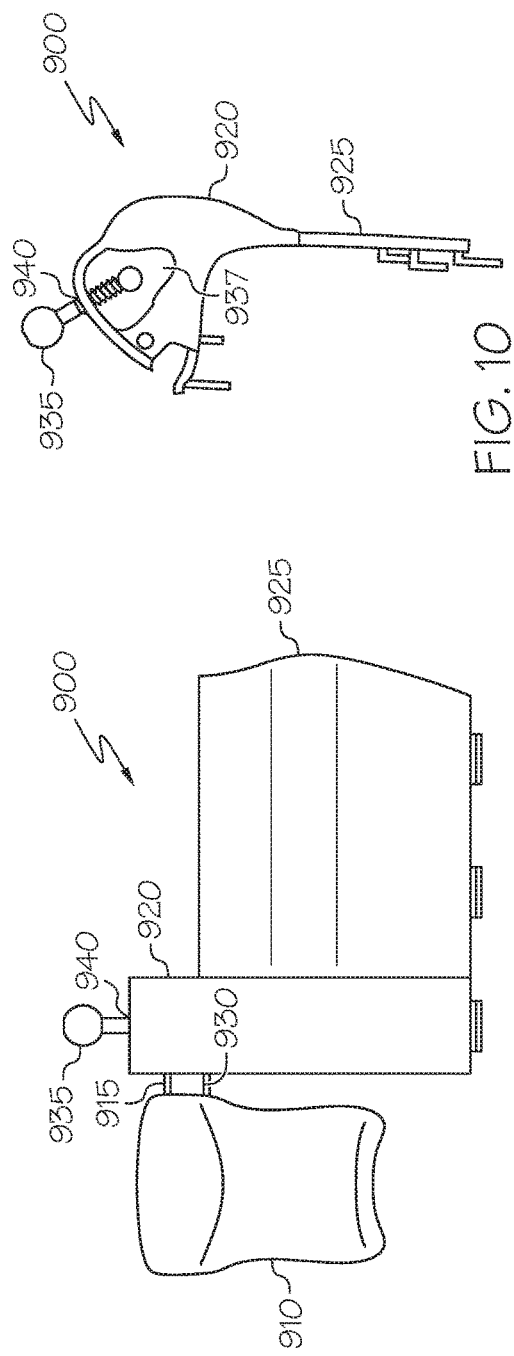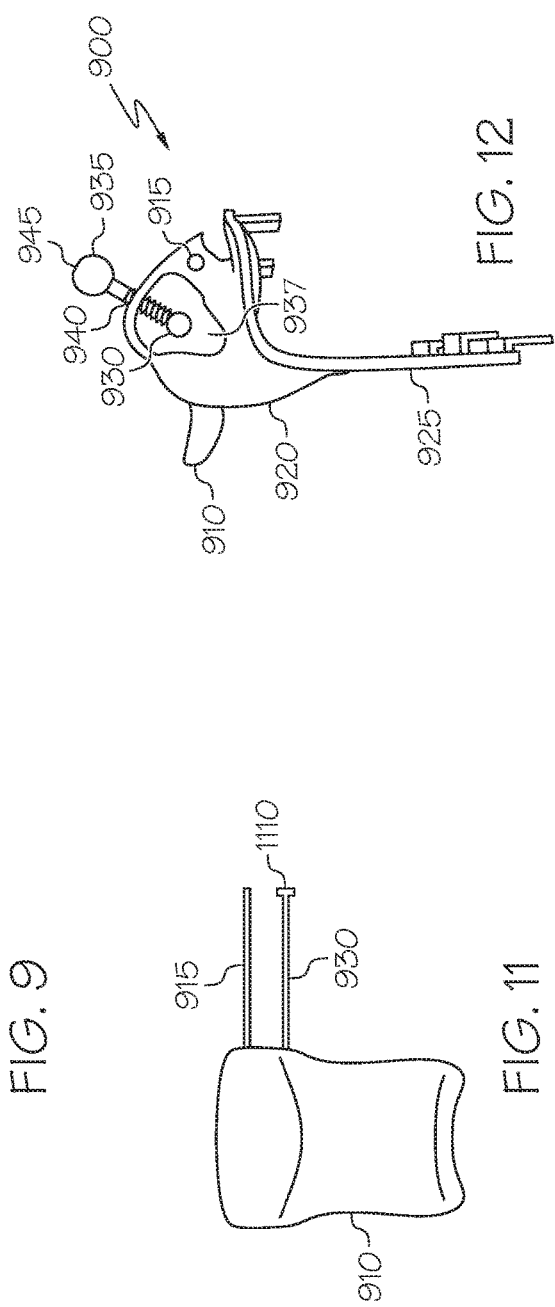

GAME CONTROLLER BUTTON BIAS ADJUSTMENT MECHANISM

RELATED APPLICATION

This application claims priority to U.S. Provisional Application Ser. No. 62/128,640 (entitled Game Controller Button Bias Adjustment Mechanism, filed Mar. 5, 2015) which is incorporated herein by reference.

BACKGROUND

Buttons for game controllers are used to control many different aspects of an unlimited number of electronic games. Some buttons are resistive, and operate to provide electrical signals representative of the amount of pressure or depth of depression by a user. The signals may be used to simulate a trigger in a shooting game, a gas pedal in a driving game, or a myriad of other elements of an electronic game that may be designated to respond to interaction with the button. Some clip on trigger enhancements are available, but merely provide an enhancement to the size and shape of the buttons they clip on to.

SUMMARY

A method includes supporting an extender to bias a button of an electronic game controller, wherein the extender is supported by an extender support coupled to a battery compartment cover, adjusting a length of an adjustable length protrusion coupled to the extender support to adjust the bias of the button, and wherein while adjustable length protrusion contacts a biasing bar coupled to the extender.

A game controller dual button action mechanism includes a first trigger body to actuate a first controller button of a controller, a second trigger body to actuate a second controller button of the controller spaced from the first controller button, a first bar coupled to the first trigger body and extending toward the second trigger body, and a second bar coupled to the second trigger body and extending toward the first trigger body, wherein the first bar overlaps at least a portion of the second bar.

A game controller button biasing mechanism includes a battery cover having a trigger support, a trigger body coupled to the trigger support to pivot about a pivot point, the trigger body having a back shaped to engage with a game controller button, and wherein the trigger support comprises an adjustable protrusion disposed in an opening to control biasing of the game controller button by the back of the trigger body via a biasing bar coupled to the trigger body.

A game controller button biasing mechanism includes a battery cover having a trigger support, a trigger extender coupled to provide user input to a button of the game controller, a pivot axel coupled between the trigger support and the trigger extender to provide a pivot point for movement of the trigger extender, and a biasing arm extending between the trigger support and the trigger extender to bias the trigger extender against the controller button.

BRIEF DESCRIPTION OF THE DRAWINGS

FIG. 9 is an elevated front view of an alternative trigger bias assembly for a button of a game controller according to an example embodiment.

FIG. 10 is a side view of the alternative trigger bias assembly of FIG. 9 according to an example embodiment.

FIG. 11 is a front elevation view of a button extender showing a pivot axel and bias arm according to an example embodiment.

FIG. 12 is a side view of the trigger bias assembly for a button of a game controller according to an example embodiment.

DETAILED DESCRIPTION

In the following description, reference is made to the accompanying drawings that form a part hereof, and in which is shown by way of illustration specific embodiments which may be practiced. The drawings are not necessarily to scale. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A game controller extender couples to a button on an electronic game controller and includes an adjustable depth protrusion, such as a screw, to adjust a biasing of the game controller button. In one embodiment, the extender snaps into retentive contact with or is otherwise adhered to the button with the protrusion positioned to extend above the button to contact a fixed portion of the game controller. The length of the protrusion may be adjusted to partially depress the button, providing a user with the ability to adjust the amount of movement of the extender used to perform an action in the electronic game.

Where the button is a resistive based button used to simulate a trigger or gas pedal in the game, the protrusion allows adjusting the amount of pressure used to perform the desired action.

The extender may take different shapes, including a shape that is coextensive with the shape of the button but effectively extends the button outward and provides a concave surface for interaction with a finger of the user. In further embodiments, the extender further extends at least partially orthogonal to the direction of movement of the button, providing a larger range of motion to a user utilizing the further extension.

Figure 1:
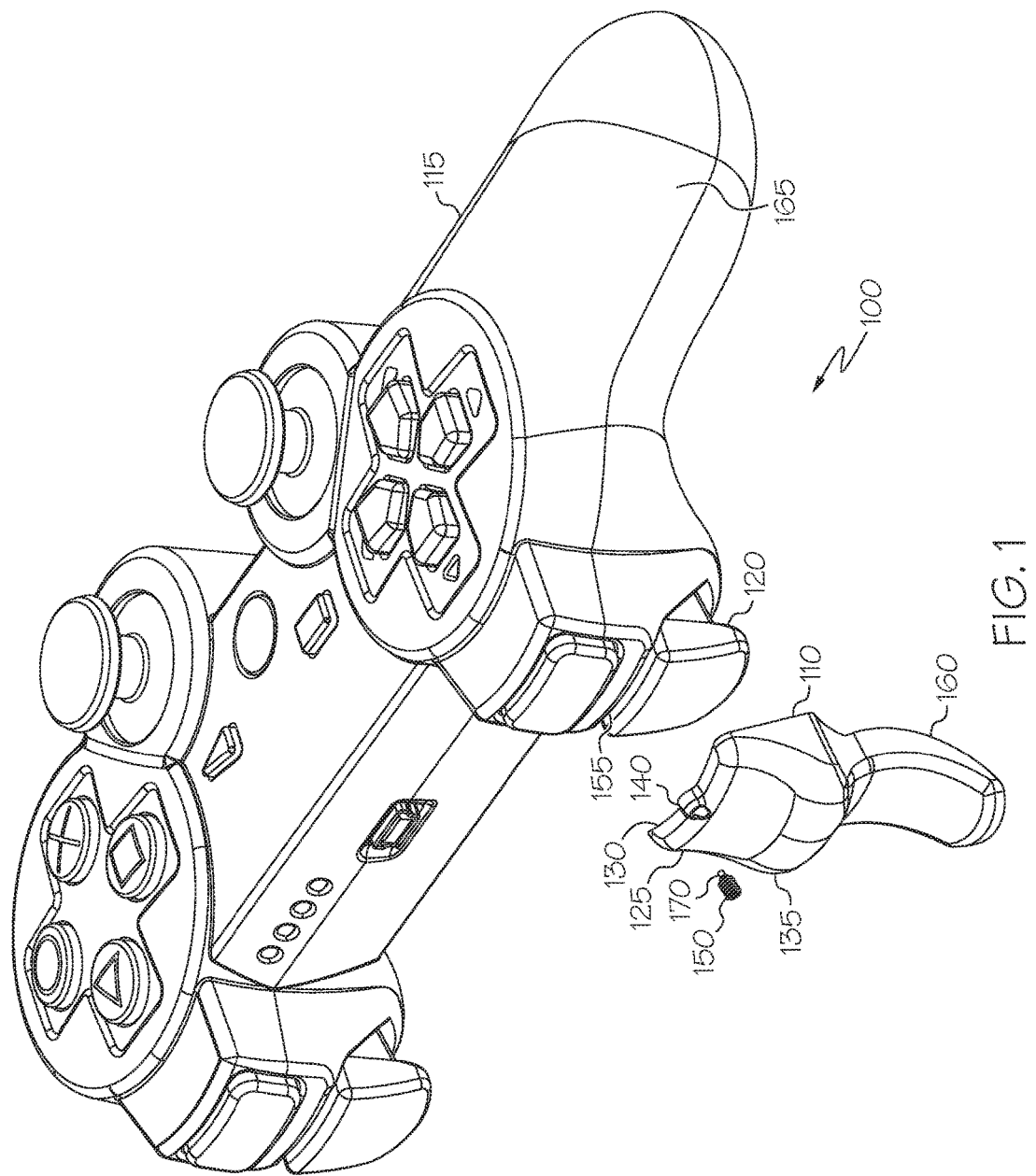
FIG. 1 is an exploded perspective view of an extender for coupling to a game controller button according to an example embodiment.

FIG. 1 is an exploded perspective view 100 of an extender 110 for coupling to a game controller 115 button 120. The extender 110 may be a molded plastic piece, or 3D printed, or otherwise formed, and includes a body 125 having a top portion 130 of the body 125 having a back shaped to mate with the game controller button 120. A bottom front portion 135 extending away from the top back portion forming a front surface 140 of the body 125. An opening 145 is formed in the top portion 130 of the body positioned to hold an adjustable depth protrusion 150, which when installed in the opening 145 extends away from the back of the top portion 130 to contact a surface 155 of the game controller 115 adjacent the game controller button 120, such that the game controller button 120 is biased as a function of a distance the protrusion extends away from the top portion 130 of the body 125. In various embodiments, the game controller button has a range of motion into an opening in the surface of the game controller. The term adjacent is used to signify that the protrusion extends in a manner to contact the surface near the opening, or at least such that it can function to bias or depress the button depending on the length the protrusion extends from the extender 110.

In one embodiment, the opening 145 comprises a threaded hole extending through the top portion and the adjustable depth protrusion 150 comprises a screw having a flat surface to contact the game controller surface. The opening may include a separate threaded portion formed of plastic, metal, or other stiff material suitable for being retained in the opening and providing mating threads for the protrusion. The opening in further embodiments may include a clip or other mechanism for adjusting a non-threaded protrusion, such as a ribbed rod, or piston, or other type of adjustable length mechanism.

In one embodiment, the bottom portion 135 covers the game controller button 120 and has a surface area coextensive with a surface of the game controller button 120. In a further embodiment, the bottom portion 135 extends away from the surface of the game controller button, forming a concave surface trigger portion 160 suitable for interaction with a finger of a user. The trigger portion may be angled away from the controller button 120 in a manner that provides good tactile feel for a user without interfering with expected gripping styles of the game controller 115. For instance, one side 165 of the game controller 115 may be gripped in the palm of a user, with an index or middle finger used to contact the controller button 120 via the extender 110. The range of motion of the trigger portion 160 should not interfere with other fingers while handling the game controller 115. The trigger may form an angle from the direction of motion of the button 120 that ranges from orthogonal to the direction of motion to several degrees beyond orthogonal to move the trigger further away from the button and side 165 of the game controller.

In one embodiment, the controller 115 may be a Sony PlayStation® controller, but may be any other type of controller in further embodiments. While the extender may be described as an add-on piece to a controller button, in some embodiments, the controller button may also include an integrated structure to provide an adjustable length protrusion. The integrated structure may include an adjustable length protrusion and may modify the profile of the button to have a similar profile to that described herein.

Figure 2:
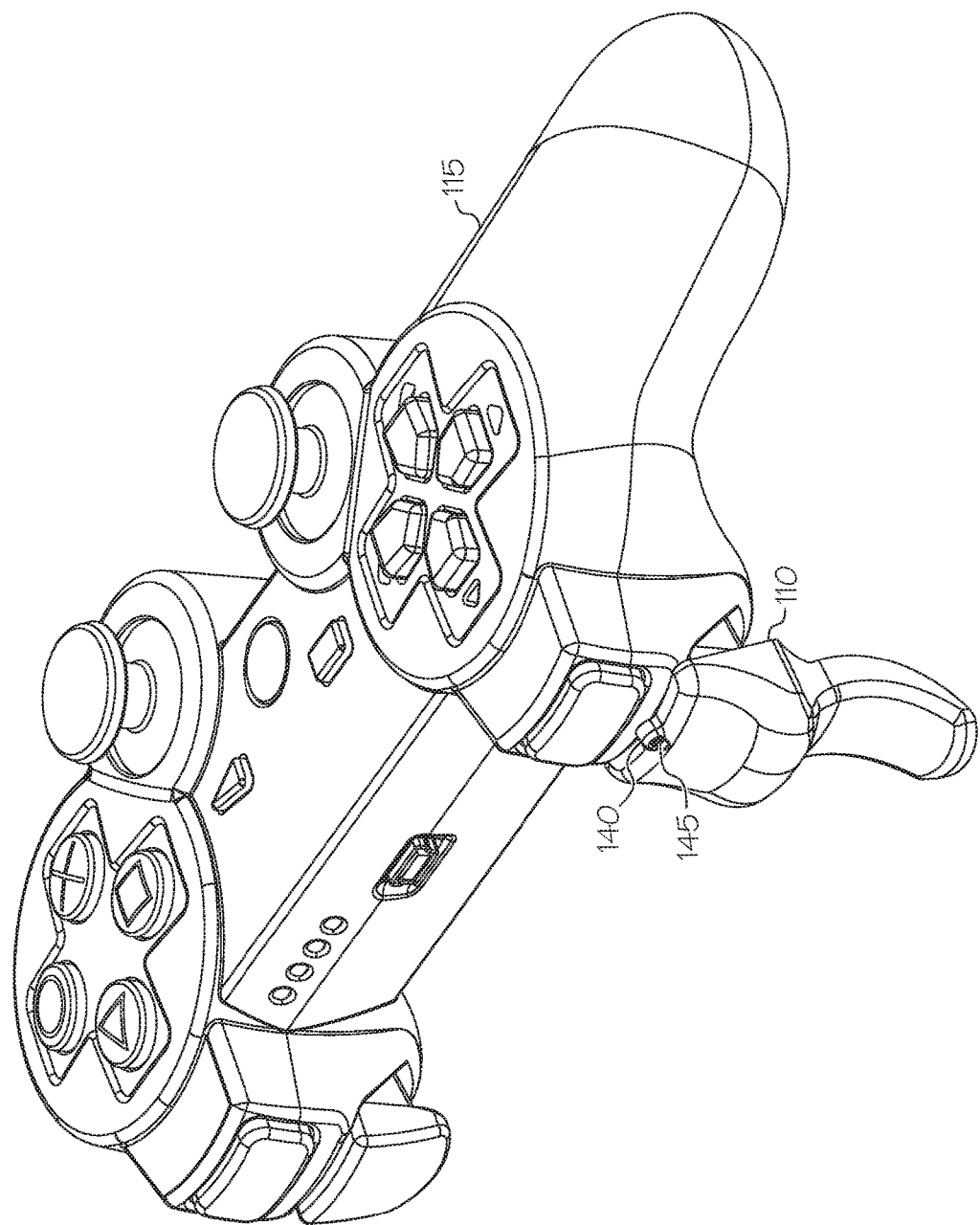
FIG. 2 is a perspective view of an extender coupled to a game controller button according to an example embodiment.

FIG. 2 is a perspective view of the extender 110 coupled to the game controller 115. The protrusion 150 is shown installed in the opening 140 and is pressing against surface 155 of the game controller 115. In one embodiment, the protrusion is a screw with a hex head for adjusting a protrusion depth. The tip of the screw may be a flat surface in one embodiment to avoid marring the surface 155. In addition, the opening may be positioned to form an angle to the surface 155 that is substantially orthogonal to the surface to minimize marring. Still further, the tip may be in the shape of a cone, or may including a nylon or other soft material tip 170 to further minimize marring.

In use, multiple surfaces may be used by a user in a two finger action mode. One finger, such as forefinger may be used to actuate the extender via front surface 140, while a second finger, such as a middle finger, may alternately be used to actuate the extender via trigger portion 160. Such a mode may increase the speed at which a user may actuate the button 120.

Figure 3:
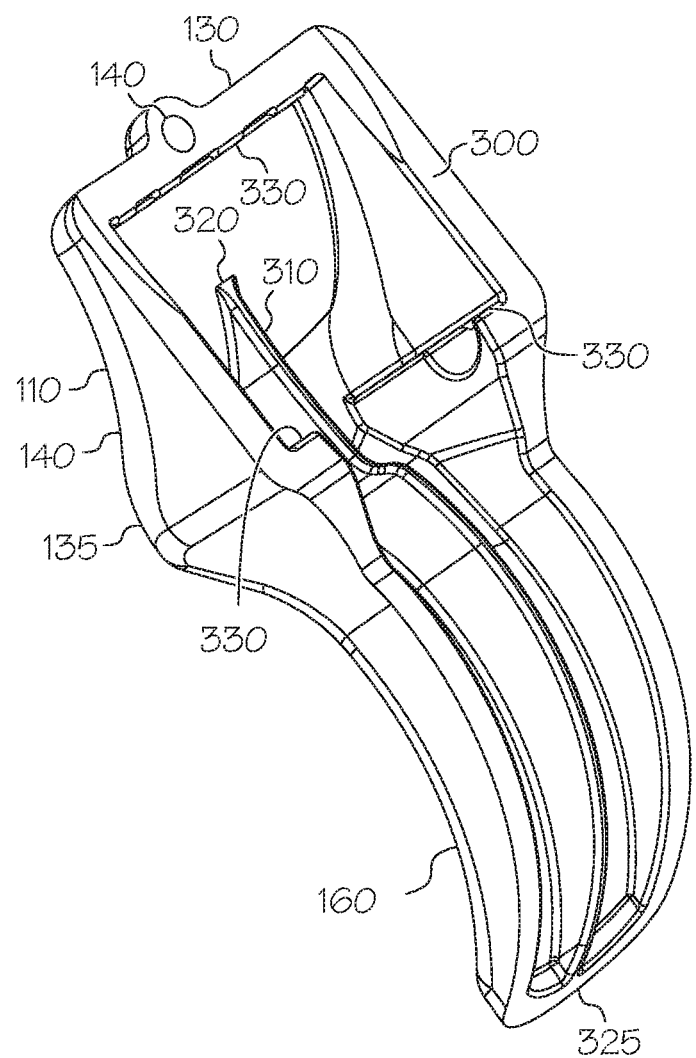
FIG. 3 is a perspective view of a back side of an extender for coupling to a game controller button according to an example embodiment.

FIG. 3 is a perspective view of a back side 300 of the extender 110. The back side 300 includes one or more ribs 310 positioned along a length of the back side of the extender 110 to provide reinforcement for increasing the structural integrity and strength of the extender 110. In one embodiment, the rib runs longitudinally along a center of the extender 110. The rib or ribs in one embodiment provide an additional stiffness to the extender such that there is minimal bending of the extender 110 during use. The rib in one embodiment may be a single rib extending from the near the top portion 130 as indicated at 320 to a far end 325 of the trigger portion 160. The top portion of the rib may be recessed within the back of the extender 110 to allow for attachment to a game controller button. In further embodiments, multiple ribs may be used, including one or more longitudinal ribs as shown, and may also include any manner of cross hatching ribs.

One or more lips 330 may be included on the back side 300 to form snap fit portions of the extender 110. The ridges or rib 310 may be recessed into the back portion 300 to provide a cavity to allow the back portion 300 to fit over the button 120 such that the lips 330 snap into place behind a back of the button 120, into one or more recesses in button 120, or over a ridge or ridges on button 120 to be adhered to the button 120. Releasing the extender may be easily accomplished by either using the optional trigger portion to pry the extender off the button, or removing the protrusion 150 and using a hex wrench as a lever to pry the extender off the button.

In one embodiment, lip 330 extends over only a portion of the back side 300 of the extender 110, or over multiple selected portions depending on the amount of retentive force desired to either operate the button using the extender, or remove the extender. The lips 330 in one embodiment may include a top lip at the top portion 130 and two side lips on the bottom portion sides to snap onto a corresponding bottom of the button. The arcuate shape of the trigger portion 160 is illustrated in FIG. 3. Such shape may provide an enhanced ergonomic feel to a user.

Figure 4:
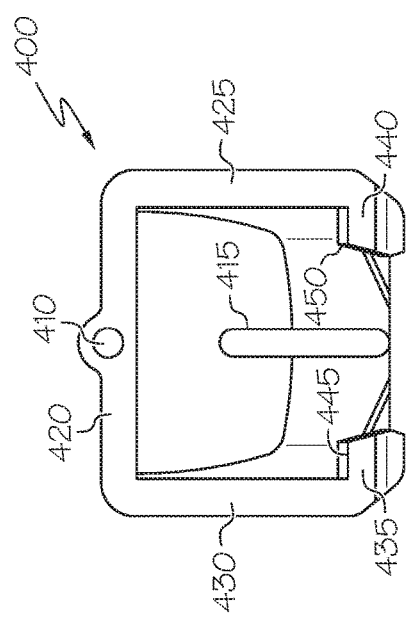
FIG. 4 is a back view of an extender for coupling to a game controller button according to an example embodiment.

FIG. 4 is a back view of an extender 400 illustrating an opening 410 for an adjustable length protrusion, and a back rib 415 for reinforcing the extender 400. The back of extender 400 includes a top edge 420, side edges 425, 430, and bottom edges 435, 440, which are shorter edges that partially extend in from sides 425, 430. The bottom edges 435 and 440 may include lip portions 445, 450 that serve as protrusions that snap onto the controller button 120.

Figure 5:
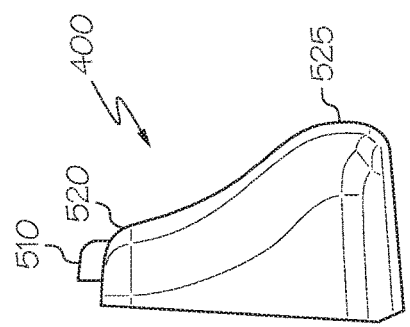
FIG. 5 is a side view of an extender for coupling to a game controller button according to an example embodiment.

FIG. 5 is a side view of the extender 400. From this view, the profile of the extender 400 is illustrated with a top portion having a bump 510 for positioning the opening 410 appropriately to contact a desired portion of the game controller body when the extender is snapped onto the bottom, or otherwise adhered to the button. The bump and opening may be easily modified for many different configurations of controller buttons and controller bodies to ensure the protrusion contacts the controller body at a position to minimize marring and/or optimize leverage and biasing adjustment of the button via the extender and adjustable length protrusion. A profile of the surface of the extender 400 extends in an arcuate shape from the top portion 520 to a bottom portion 525. The profile is a concave surface, with the bottom portion 525 extending further away from the button than the top portion. The concave surface may provide an ergonomic feel to the user.

Figure 6:
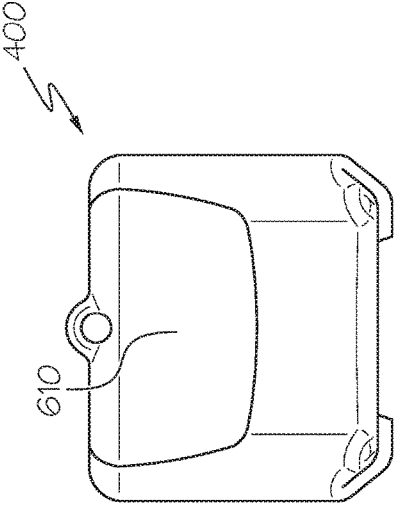
FIG. 6 is a front view of an extender for coupling to a game controller button according to an example embodiment.

FIG. 6 is a front view of the extender 400, and may include a logo or other symbol indicated at 610.

Figure 8:
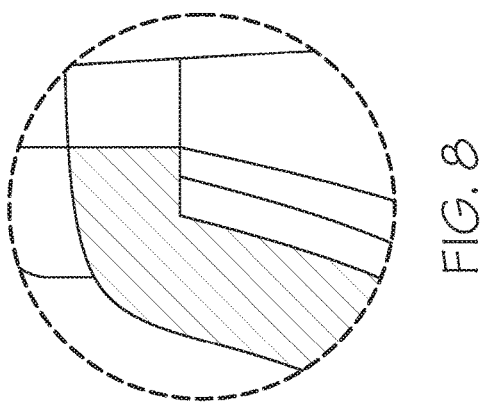
FIG. 8 is an enlarged view of a portion 8 of the cross section view of FIG. 7 according to an example embodiment.
Figure 7:
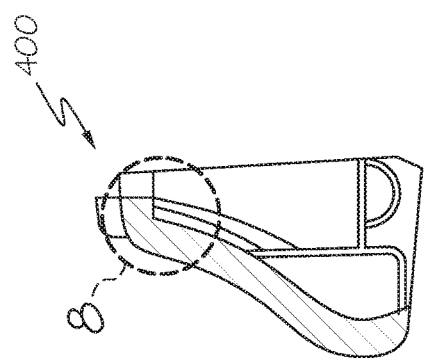
FIG. 7 is a side cross section view of extender taken along lines 6-6 from FIG. 6.

FIG. 7 is a side cross section view of extender 400 taken along lines 6-6 from FIG. 6. A circle 8 identifies a portion of extender 400 in FIG. 7 which is shown in an enlarged cross section in FIG. 8.

In one embodiment, the length of the adjustable length protrusion may be adjusted using a suitable tool, such as a screwdriver wherein the protrusion is a screw, or a hex wrench wherein the head of the screw is adapted to fit a hex wrench. The adjustment may be performed while the electronic game is active to observe an effect of the biasing of the button in the game. The ability to adjust the length of the protrusion provides the ability to have enhanced, custom tailored sensitivity that can dramatically affect the gaming experience.

A method of using the extender may include adhering the extender to a button of an electronic game controller and adjusting a length of an adjustable length protrusion coupled to the extender to extending into a fixed surface of the electronic game controller to bias the button. While adjusting the length of the adjustable length protrusion, the effect of the length on an aspect of the electronic game controlled by the button of the electronic game controller may be viewed to obtain a desired biasing of the button.

In further embodiments, the extender may be integrated with the button and formed as a single injection molded piece. Such an integrated extender would obviate the use of lips to form a snap fit with an existing button, as the button itself would be formed with an adjustable length protrusion. In one embodiment, a game controller extended button includes a body coupled to provide user input to the game controller. The button body thus includes the button and may be installed in the game controller in the same manner as the button. An arcuate surface of the body extends out from the game controller. An opening formed in a top portion of the body of the button is positioned to hold an adjustable depth protrusion extending away from the back of the top portion to contact a surface of the game controller adjacent to the button, such that the game controller extended button is biased as a function of a distance the protrusion extends away from the top portion of the body.

FIG. 9 is an elevated front view of a trigger bias assembly 900 for a button of a game controller, such as an XBox® controller. As with previously described embodiments, extender 910 in the shape of a trigger is designed to sit on top of a controller button and bias the button in a partially on position. In one embodiment, the extender may be similar to extender 110 shown in FIG. 3 or at 400 in FIG. 4, with a ribbed backside designed to contact the button of the game controller. Note that the button provides a resistive pressure to biasing force provided by the extender 910.

Rather than attaching or adhering directly to the button, the extender 910 may simply sit on top of the button. In one embodiment, the button includes a pivot point, illustrated as a pivot axel 915 that extends into an extender support or trigger support 920 that is positioned adjacent the extender 910. The pivot axel 915 may be coupled to the extender and pivot within suitable openings in the trigger support 920, or alternatively be coupled to the trigger support 920 and pivot within suitable openings in the extender 910. The trigger support 920 thus provides a mechanism to allow the extender 910 to rotate about a pivot point defined by the pivot axel, and actuate the button of the controller, which is not shown.

In one embodiment, the trigger support 920 is coupled to a battery cover 925. When the battery cover 925 is installed in the controller, the trigger support 920 supports the extender in a suitable position for contacting the controller button and adjustably biasing the button in a partially depressed position.

Biasing the button is accomplished in one embodiment by the use of a bias arm 930 that extends from the extender 910 into the trigger support 920. A biasing pin 935 is supported by the trigger support 920 and has an adjustable depth into the trigger support to contact the bias arm 930, which also extends laterally from the extender 910 into a cavity 937 (shown in a side view of trigger support 920 in FIG. 10) in the trigger support 920. Increased depth of the biasing pin 935, which may be a threaded pin supported in a threaded opening 940 of the trigger support 920 increases the amount of bias the extender 910 imposes on the controller button. In further embodiments, the bias arm may be part of the trigger support 920, and may contact an aperture in the extender 910 to bias the extender against the controller button.

In various embodiments, the battery cover 925 and trigger support 920 may be a single piece of molded plastic, with the battery cover 925 having a shape compatible with existing battery covers to cover a battery compartment of the controller. While a trigger support and trigger extender are shown on one side of the battery cover, a second trigger support and trigger extender may be included on a second side of the battery cover in further embodiments such that both buttons of a common controller may be biased by extenders.

FIG. 11 is a front elevation view of extender 910 showing pivot axel 915 and bias arm 930 in one embodiment. Bias arm 930 may include a knob 1110 to help retain the extender 910 in the trigger support 920 via the biasing pin 935 contacting the bias arm 930 prior to the knob 1110. The bias pin 935 thus impedes lateral movement of the bias arm, as the bias knob contacts the bias pin 935. The extender 910 may also be held in place by the back of the extender comprising a cavity with a rib support that fits over the button and contacts the button. Since the button is biased in the cavity, the extension is inhibited from moving away from the button. The pivot axel 915 also inhibits movement of the extension off of the button.

FIG. 12 is a side view of the trigger bias assembly 900 looking from the battery cover 920 toward the extender 910. The cavity 937 in this embodiment is shown and allows view of the bias pin 935 contacting the bias arm 930, resulting in vertical movement of the extender 910 with respect to the view provided in FIG. 12, and corresponding differences in bias of the controller button. The bias pin 935 may also include a larger diameter top 945 to enable easy hand adjustment of the depth of the bias pin 935.

Figure 13:
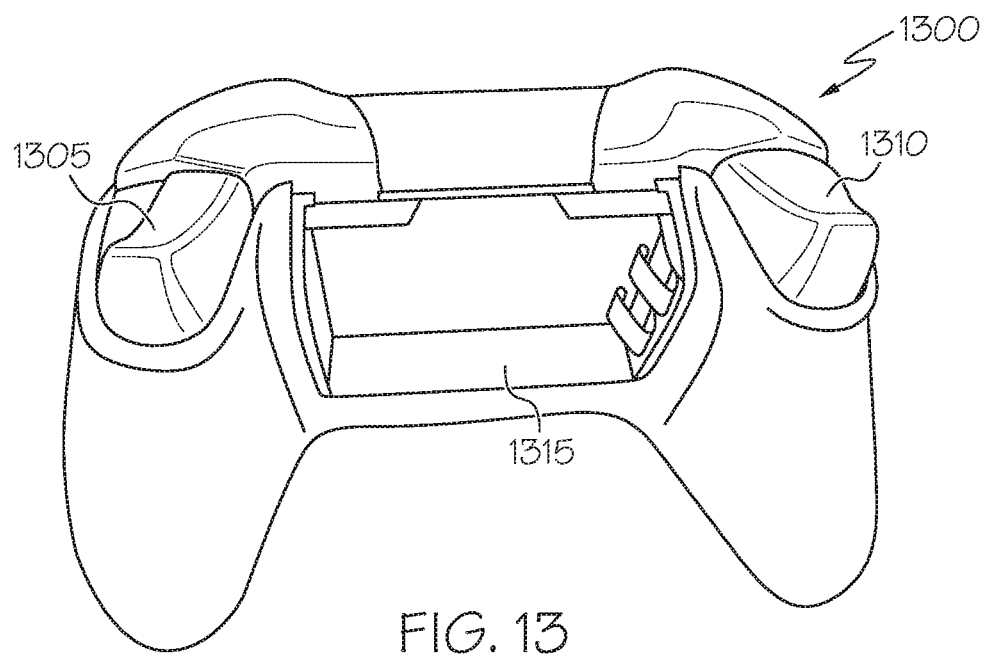
FIG. 13 is a front block diagram view of a controller having buttons according to an example embodiment.

FIG. 13 is a front block diagram view of a controller 1300 having buttons 1305 and 1310 disposed on either side of a battery compartment 1315, shown without the battery cover. When the trigger bias assembly 900 is installed over the battery compartment 1315, one, or both of the buttons 1305 and 1310 may be covered by an extender 910 and biased at least partially depressed depending on the depth of corresponding biasing pins. Note that in some controllers, such as the Xbox controllers, the buttons 1305 and 1310 have rounded shapes that do not lend themselves to an extender that clips directly on to the buttons. By providing a trigger bias assembly 900 that replaces an existing battery cover and snaps into place, and includes one or more trigger supports, adjustable bias extenders may be provided without modification of the controller buttons themselves. The extenders thus may comply with rules and ethics of using game controllers. Several other buttons and control surfaces may be unaffected by the use of the trigger bias assembly 900.

Figure 14:
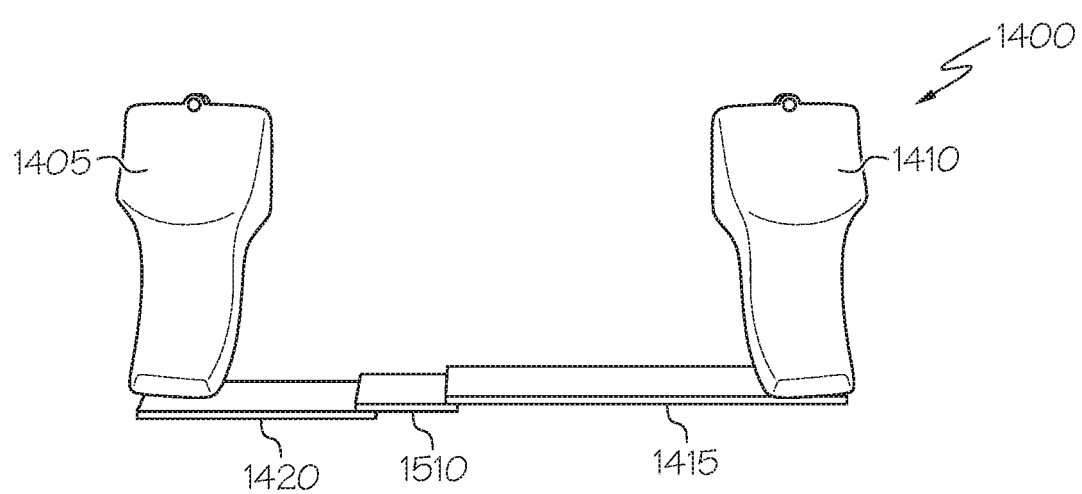
FIG. 14 is a block diagram view of an extender assembly that can be used to control the functions of two buttons being extended according to an example embodiment.

FIG. 14 is a block diagram view of an extender assembly 1400 that can be used to control the functions of two buttons being extended. The assembly 1400 in one embodiment includes two trigger bodies or extenders indicated at 1405 and 1410. The extenders may be similar to extenders 110 or 910 in various embodiments. In other words, they may snap directly on to two buttons of the controller, or may be supported by trigger supports on a battery cover as described above. In one embodiment, one of the triggers has an extender bar 1415 that is coupled to extender 1410 and extends toward the other extender 1405, which may also have an extender bar 1420 that extends back toward extender 1410. In one embodiment, extender bar 1415 overlaps extender bar 1420 at distal ends of the bars, such that depression of extender 1410 past a certain point results in depression of extender 1405 via extender bar 1420 being pressed by extender bar 1415. The dual extender bars allow one button to be actuated by one extender, and for the same extender to also actuate a second button when the extender is depressed past a certain point that is a function of the relative lengths and stiffness or elasticity of the extender bars. The extender bars may be simple plastic beams or other stiff material such as metal, and may also have ribbed shapes to increase stiffness in some embodiments. In some embodiments, each extender and extender bar may be a single molded piece.

Figure 15:
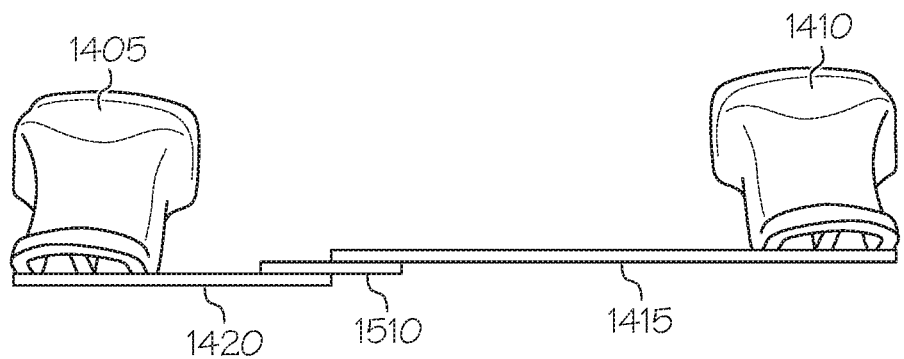
FIG. 15 is a side view of the extender assembly of FIG. 14 according to an example embodiment.

FIG. 15 is a side view of the extender assembly of FIG. 14 that illustrates a side view of the extender assembly 1400, more clearly illustrating interaction of the extender bars 1415 and 1420. In one embodiment, a shim 1510 may be coupled to one of the extender bars 1415 or 1420 to modify the point at which depressing one of the extenders also results in actuation of the other extender. The thicker the shim 1510, the less depression required to actuate the second extender. Multiple shims or different thickness shims may be attached view screw, slip fit, adhesive, or other attachment mechanism to provide adjustability of actuation of the second button. In further embodiments, the shim may be integrally formed with one of the extender bars 1415, 1420 rather than simply attached to one. In still further embodiments, the shim may be an adjustable length protrusion, similar to that used to adjust the bias of the extender, such as a screw in a threaded hole to allow adjustment of the amount of actuation of one extender results in actuation of the other extender and corresponding controller button. The stiffness of the bars and biasing adjustments of the extenders may also affect the preselected point of depression at which the second actuation occurs.

Figure 16:
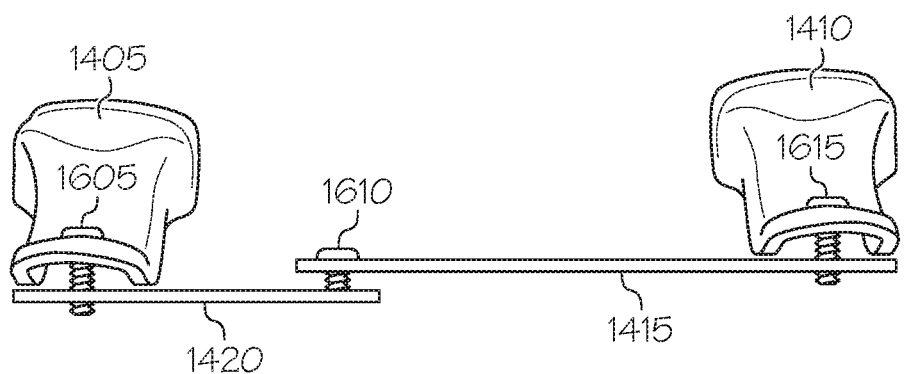
FIG. 16 is a side view of an alternative extender assembly according to an example embodiment.

FIG. 16 is a side view of the extender assembly 1400 that is modified to provide additional flexibility. In this embodiment, the extender bars 1415 and 1420 overlap, and each is adjustably coupled to extenders 1405 and 1410 respectively by screws 1605 and 1615. The screws allow vertical adjustment, with reference to the view shown, of the bars and corresponding extenders, allowing adjustment of the interactive actuation of both extenders. Note that when installed on a controller, the extenders 1405 and 1410 will be at the same height, and the bars may appear bent or angled. In some embodiments, the bars may have a tapered profile such that they are thicker where attached to the extenders and become thinner by the time they overlap. In addition to providing an aesthetic quality, the taper may also provide an effective mechanism to adjust relative bar spring constants to obtain desired adjustability and performance. A further adjustment mechanism, shown as screw 1610 positioned where the bars overlap, may be used to provide a further adjustment point for when depressing extender 1615 results in actuation of the button associated with extender 1405. In a further embodiment, different adjustment mechanisms may be used to provide adjustability of the bars with respect to the extenders and/or each other. Some embodiments may utilize only one adjustment mechanism 1605, 1610, or 1615, or various combinations of two or more adjustment mechanisms.

Actuation of two buttons by a single button can be very useful when using the controller to play a game. Many times, the position of a player or tool/weapon in a game is manipulated by one or more buttons other than the buttons 1405 and 1410. When one finger is used to manipulate the position and another finger on the same hand via one finger as well as perform an action using a different finger, the finger manipulating the position can involuntarily move, resulting in unintentionally modifying the position and adversely affecting game performance. By enabling a user to use a finger on a different hand to actuate two different buttons, game performance can be improved. The extender bars still allow independent actuation of both buttons by the relative extenders, but also allow one extender to be depressed even further to control actuation of two buttons on the controller. The extender having the extender bar beneath the extender bar of the other extender may be actuated without affecting the other extender.

EXAMPLES

A: Battery Cover Embodiment

1. A game controller button biasing mechanism comprising:
   a battery cover having a trigger support;
   a trigger body coupled to the trigger support to pivot about a pivot point;
   the trigger body having a back shaped to engage with a game controller button; and
   wherein the trigger support comprises an adjustable protrusion disposed in an opening to control biasing of the game controller button by the back of the trigger body via a biasing bar coupled to the trigger body.

2. The game controller button biasing mechanism of claim 1 wherein the pivot point comprises an axel coupled to the trigger body.

3. The game controller button biasing mechanism of any of claims 1-3 wherein the biasing bar comprises a rod supported by the trigger body and extending into the opening of the trigger support.

4. The game controller button biasing mechanism of any of claims 1-3 wherein the pivot point comprises an axel coupled to the trigger body and wherein the biasing bar comprises a rod supported by the trigger body and extending substantially parallel to the axel into the opening of the trigger support.

5. The game controller button biasing mechanism of any of claims 1-4 wherein the trigger support comprises a threaded hole extending through the trigger support and the adjustable protrusion comprises a screw having a tip to contact the biasing bar.

6. The game controller button biasing mechanism of any of claims 1-5 wherein the button the back of the trigger body engages with is a pressure sensitive button.

7. The game controller button biasing mechanism of claim 6 wherein the adjustable protrusion applies more biasing pressure to the pressure sensitive button the deeper the protrusion extends out the back of the top portion of the button.

8. The game controller button biasing mechanism of any of claims 1-7 wherein the trigger body includes a bottom portion having a shape of a trigger.

9. The game controller button biasing mechanism of any of claims 1-8 wherein the back of the trigger body covers the game controller button and wherein a front of the trigger body has a surface area coextensive with a surface of the game controller button.

10. The game controller button biasing mechanism of any of claims 1-9 wherein a bottom portion of the trigger body extends away from the surface of the game controller button, forming a concave surface suitable for interaction with a finger of a user.

11. A game controller button biasing mechanism comprising:
    a battery cover having a trigger support;
    a trigger extender coupled to provide user input to a button of the game controller;
    a pivot axel coupled between the trigger support and the trigger extender to provide a pivot point for movement of the trigger extender; and
    a biasing arm extending between the trigger support and the trigger extender to bias the trigger extender against the controller button.

12. The game controller button biasing mechanism of claim 11 wherein the pivot point comprises an axel coupled to the trigger body.

13. The game controller button biasing mechanism of any of claims 11-12 wherein the biasing bar comprises a rod supported by the trigger extender and extending into the opening of the trigger support.

14. The game controller button biasing mechanism of any of claims 11-13 wherein the pivot point comprises an axel coupled to the trigger extender and wherein the biasing bar comprises a rod supported by the trigger body and extending substantially parallel to the axel into the opening of the trigger support.

15. The game controller button biasing mechanism of any of claims 11-14 wherein the trigger support comprises a threaded hole extending through the trigger support and an adjustable protrusion comprising a screw having a tip to contact the biasing bar.

16. The game controller button biasing mechanism of claim 15 wherein the adjustable protrusion applies more biasing pressure to the pressure sensitive button the deeper the protrusion extends out the back of the top portion of the button.

17. The game controller button biasing mechanism of any of claims 11-16 wherein the back of the trigger extender engages biases the controller button which comprises a pressure sensitive button.

18. The game controller button biasing mechanism of any of claims 11-17 wherein the trigger extender includes a bottom portion having a shape of a trigger.

19. The game controller button biasing mechanism of any of claims 11-18 wherein the trigger body has a back that covers the game controller button and wherein a front of the trigger extender has a surface area coextensive with a surface of the game controller button.

20. The game controller button biasing mechanism of any of claims 11-19 wherein a bottom portion of the trigger body extends away from the surface of the game controller button, forming a concave surface suitable for interaction with a finger of a user.

21. A method comprising:
    supporting an extender to bias a button of an electronic game controller;
    wherein the extender is supported by an extender support coupled to a battery compartment cover;
    adjusting a length of an adjustable length protrusion coupled to the extender support to adjust the bias of the button; and
    wherein while adjustable length protrusion contacts a biasing bar coupled to the extender.

B. Dual Button Control Extender Bars

1. A game controller dual button action mechanism comprising:
    a first trigger body to actuate a first controller button of a controller;
    a second trigger body to actuate a second controller button of the controller spaced from the first controller button;
    a first bar coupled to the first trigger body and extending toward the second trigger body; and
    a second bar coupled to the second trigger body and extending toward the first trigger body, wherein the first bar overlaps at least a portion of the second bar.

2. The game controller dual button action mechanism of claim 1 wherein the first and second trigger bodies each comprise:
    a top portion of the trigger body having a back shaped to mate with the game controller button;
    a bottom portion extending away from the top portion in the shape of a trigger forming a front surface of the trigger body; and
    wherein the first and second bars are coupled to a distal ends of the respective bottom portions.

3. The game controller dual button action mechanism of claim 2 wherein the first and second trigger bodies each comprise an opening formed in the top portion of the trigger body positioned to hold an adjustable depth protrusion extending away from the back of the top portion to contact a surface of the game controller adjacent the game controller button, such that the game controller button is biased as a function of a distance the protrusion extends away from the top portion of the trigger body.

4. The game controller dual button action mechanism of claim 2 wherein the first and second trigger bodies each comprise a pivot point coupled to an adjacent extender support and are coupled to a biasing bar to bias the game controller button.

5. The game controller dual button action mechanism of claim 1 wherein the first bar overlaps at least a portion of the second bar at distal ends of each bar such that depressing the first bar by pressing the first trigger body past a preselected point, depresses the second trigger body, actuating the second controller button.

6. The game controller dual button action mechanism of claim 5 and further comprising a shim coupled between the distal ends of each bar to adjust the preselected point.

7. The game controller dual button action mechanism of claim 1 wherein the respective trigger bodies and bars are single molded plastic pieces.

8. The game controller dual button action mechanism of claim 1 wherein the first bar is longer than the second bar.

9. The game controller dual button action mechanism of claim 1 wherein the extender bars allow independent actuation of both buttons by the relative trigger bodies over selected amounts of depression of the extenders.

C. Directly Adjustable Trigger Extender

1. A game controller button extender comprising:
a trigger body;
a top portion of the trigger body having a back shaped to mate with a game controller button;
a bottom front portion extending away from the top back portion forming a front surface of the trigger body; and
an opening formed in the top portion of the trigger body positioned to hold an adjustable depth protrusion extending away from the back of the top portion to contact a surface of the game controller adjacent the game controller button, such that the game controller button is biased as a function of a distance the protrusion extends away from the top portion of the trigger body.

2. The game controller button extender of example 1 wherein the back of the top portion comprises ridges to provide a snap fit retentive mating with the game controller button.

3. The game controller button extender of any of examples 1-2 and further comprising the adjustable depth protrusion.

4. The game controller button extender of example 3 wherein the opening comprises a threaded hole extending through the top portion and the adjustable depth protrusion comprises a screw having a flat surface to contact the game controller surface.

5. The game controller button extender of example 4 wherein the threaded opening is positioned such that the adjustable depth screw contacts the surface of the game controller substantially orthogonal to the surface.

6. The game controller button extender of any of examples 1-5 wherein the button the back of the top portions mates with is a pressure sensitive button.

7. The game controller button extender of example 6 wherein the adjustable protrusion applies more biasing pressure to the pressure sensitive button the deeper the protrusion extends out the back of the top portion of the button.

8. The game controller button extender of any of examples 1-7 wherein the bottom portion extends away from the top back portion and beyond a surface of the game controller button and is shaped to be receptive to a user finger.

9. The game controller button extender of example 8 wherein the bottom portion has a shape of a trigger.

10. The game controller button extender of any of examples 1-9 wherein the trigger body covers the game controller button and has a surface area coextensive with a surface of the game controller button.

11. The game controller button of example 10 wherein the bottom portion of the trigger body extends away from the surface of the game controller button, forming a concave surface suitable for interaction with a finger of a user.

12. A method comprising:
adhering an extender to a button of an electronic game controller;
adjusting a length of an adjustable length protrusion coupled to the extender to extending into a fixed surface of the electronic game controller to bias the button; and
wherein while adjusting the length of the adjustable length protrusion, viewing an effect of the length on an aspect of the electronic game controlled by the button of the electronic game controller to obtain a desired biasing of the button.

13. A game controller extended button comprising:
a body coupled to provide user input to the game controller;
an arcuate surface of the body extending out from the game controller; and
an opening formed in a top portion of the body positioned to hold an adjustable depth protrusion extending away from the back of the top portion to contact a surface of the game controller adjacent the button, such that the game controller extended button is biased as a function of a distance the protrusion extends away from the top portion of the body.

14. The game controller extended button of example 13 and further comprising the adjustable depth protrusion.

15. The game controller extended button of example 14 wherein the opening comprises a threaded hole extending through the top portion and the adjustable depth protrusion comprises a screw having a flat surface to contact the game controller surface.

16. The game controller extended button of example 15 wherein the threaded opening is positioned such that the adjustable depth screw contacts the surface of the game controller substantially orthogonal to the surface.

17. The game controller extended button of any of examples 13-16 wherein the button is a pressure sensitive button.

18. The game controller extended button of example 17 wherein the adjustable protrusion applies more biasing pressure to the pressure sensitive button the deeper the protrusion extends out the back of the top portion of the button.

19. The game controller extended button of any of examples 13-18 wherein a bottom portion extends away from the top portion and is shaped to be receptive to a user finger.

20. The game controller extended button of example 19 wherein the bottom portion has a shape of a trigger.

21. The game controller extended button of example 20 wherein the bottom portion extends away from the surface of the game controller button, forming a concave surface suitable for interaction with a finger of a user.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A game controller dual button action mechanism comprising:
   a first trigger body to actuate a first controller button of a controller;
   a second trigger body to actuate a second controller button of the controller spaced from the first controller button;
   a first bar coupled to the first trigger body and extending toward the second trigger body; and
   a second bar coupled to the second trigger body and extending toward the first trigger body, wherein the first bar overlaps at least a portion of the second bar, wherein the bars allow independent actuation of both buttons by the relative trigger bodies over selected amounts of depression of the trigger bodies.

2. The game controller dual button action mechanism of claim 1 wherein the first and second trigger bodies each comprise:
   a top portion of the trigger body having a back shaped to mate with the game controller button;
   a bottom portion extending away from the top portion in the shape of a trigger forming a front surface of the trigger body; and
   wherein the first and second bars are coupled to a distal ends of the respective bottom portions.

3. The game controller dual button action mechanism of claim 2 wherein the first and second trigger bodies each comprise an opening formed in the top portion of the trigger body positioned to hold an adjustable depth protrusion extending away from the back of the top portion to contact a surface of the game controller adjacent the game controller button, such that the game controller button is biased as a function of a distance the protrusion extends away from the top portion of the trigger body.

4. The game controller dual button action mechanism of claim 2 wherein the first and second trigger bodies each comprise a pivot point coupled to an adjacent extender support and are coupled to a biasing bar to bias the game controller button.

5. The game controller dual button action mechanism of claim 1 wherein the first bar overlaps at least a portion of the second bar at distal ends of each bar such that depressing the first bar by pressing the first trigger body past a preselected point, depresses the second trigger body, actuating the second controller button.

6. The game controller dual button action mechanism of claim 1 wherein the respective trigger bodies and bars are single molded plastic pieces.

7. The game controller dual button action mechanism of claim 1 wherein the first bar is longer than the second bar.

8. A game controller dual button action mechanism comprising:
   a first trigger body to actuate a first controller button of a controller;
   a second trigger body to actuate a second controller button of the controller spaced from the first controller button;
   a first bar coupled to the first trigger body and extending toward the second trigger body;
   a second bar coupled to the second trigger body and extending toward the first trigger body, wherein the first bar overlaps at least a portion of the second bar, wherein the first bar overlaps at least a portion of the second bar at distal ends of each bar such that depressing the first bar by pressing the first trigger body past a preselected point, depresses the second trigger body, actuating the second controller button; and
   a shim coupled between the distal ends of each bar to adjust the preselected point.

9. A method comprising:
   supporting a first bar via a first trigger body to actuate a first controller button of a controller, the first bar extending toward a second trigger body to actuate a second controller button of the controller; and
   supporting a second bar via the second trigger body, the second bar extending toward the first trigger body, wherein the first bar overlaps at least a portion of the second bar, wherein the bars allow independent actuation of both buttons by the relative trigger bodies over selected amounts of depression of the trigger bodies.

10. The method of claim 9 and further comprising:
    attaching a top portion of the first trigger body to the first controller button wherein the first trigger body has a back shaped to mate with the first controller button;
    attaching a top portion of the second trigger body to the second controller button wherein the second trigger body has a back shaped to mate with the second controller button, and wherein each of the first and second trigger bodies have a bottom portion extending away from the top portion in the shape of a trigger forming a front surface of the trigger body; and
    wherein the first and second bars are coupled to a distal ends of the respective bottom portions.

11. The method of claim 10 and further comprising forming an opening in the first and second trigger bodies in the top portion of the trigger body, wherein the opening is positioned to hold an adjustable depth protrusion extending away from the back of the top portion to contact a surface of the game controller adjacent the game controller button, such that the game controller button is biased as a function of a distance the protrusion extends away from the top portion of the trigger body.

12. A game controller dual button action mechanism comprising:
    a first trigger body to actuate a first controller button of a controller;
    a second trigger body to actuate a second controller button of the controller spaced from the first controller button;
    a first bar directly coupled to the first trigger body and extending toward the second trigger body; and
    a second bar directly coupled to the second trigger body and extending toward the first trigger body, such that depression of the first trigger body moves the first bar and the second bar to cause depression of the second trigger body, wherein the bars allow independent actuation of both buttons by the relative trigger bodies over selected amounts of depression of the trigger bodies.

13. The game controller of claim 12 wherein depression of the first trigger body causes actuation of the first controller button and actuation of the second controller button.

* * * * *